April 15, 1941.    A. L. WILSON ET AL    2,238,201
PURIFICATION OF HYDROCARBON LIQUIDS
Filed Sept. 18, 1937
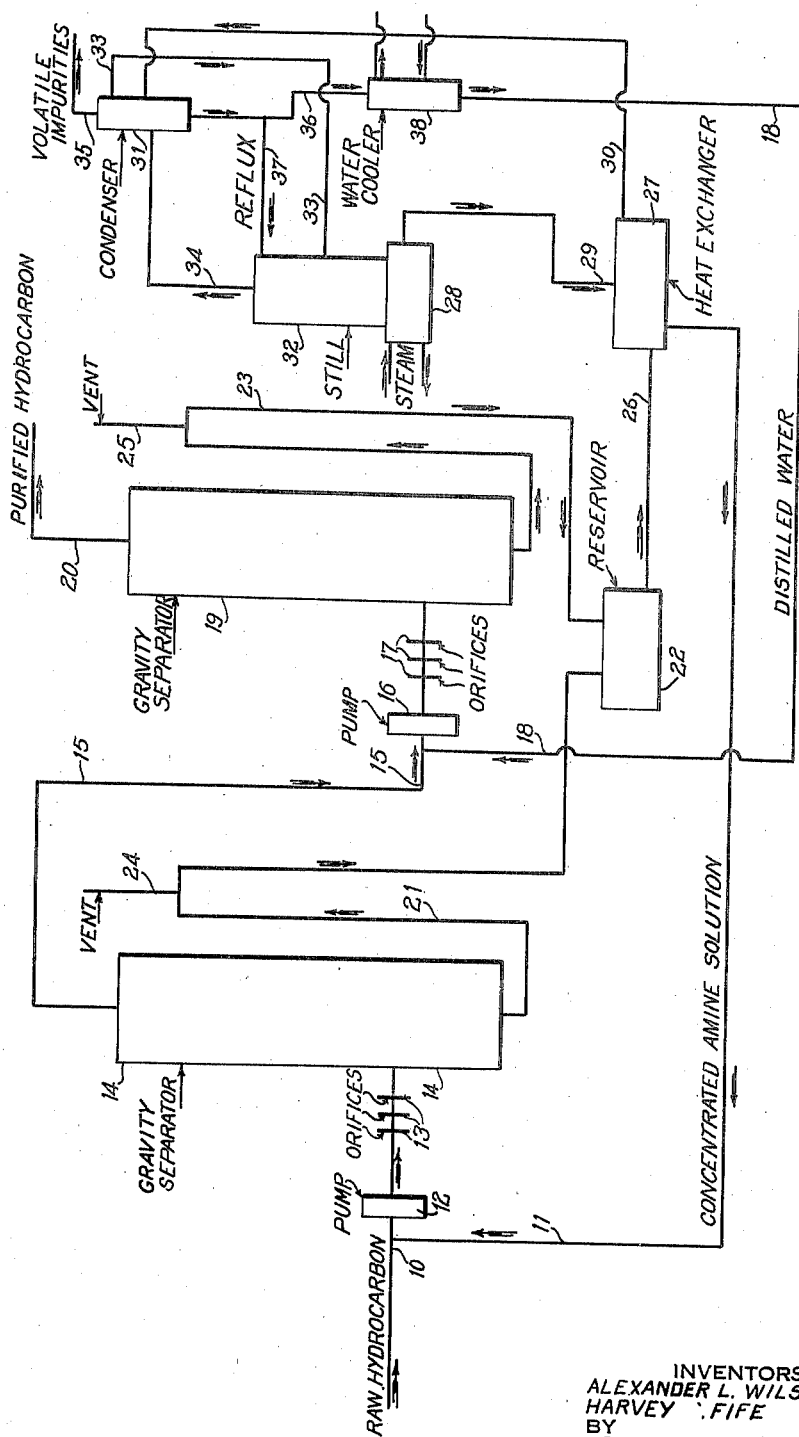
INVENTORS
ALEXANDER L. WILSON
HARVEY FIFE
BY
Charl D. Scheffler
ATTORNEY Patented Apr. 15, 1941

2,238,201

UNITED STATES PATENT OFFICE 2,238,201

PURIFICATION OF HYDROCARBON LIQUIDS

Alexander L. Wilson and Harvey R. Fife, Pittsburgh, Pa., assignors to Carbide and Carbon Chemicals Corporation, a corporation of New York Application September 18, 1937, Serial No. 164,450

8 Claims. (Cl. 196—32)

This invention is an improved process for the purification of hydrocarbon liquids, and comprises the treatment of hydrocarbons in liquid phase, with a primary, secondary, or tertiary aliphatic amine, or mixtures of such amines. The amine may be supplied either in anhydrous form or in aqueous solution. This invention has especial value in the refinement of mixtures of hydrocarbons, such as gasoline or lower boiling hydrocarbons, and it is also useful for purifying benzene, crude petroleum, and higher boiling hydrocarbons.

In the production of liquid hydrocarbons, difficulty has always been encountered in the removal of impurities, such as hydrogen sulfide, mercaptans, phenols, aldehydes, and carbon disulfide, and, in particular, impurities of acidic nature. In a few cases the acidic constituent or other impurity in the liquid hydrocarbon itself is valuable, and it is desirable to concentrate or isolate it.

The customary method for the purification of liquid hydrocarbons, particularly gasoline, consists in treating the gasoline with a sodium hydroxide solution. This method is expensive, since the sodium hydroxide cannot be regenerated after having been used.

The principal object of this invention is to provide a simple, continuous, and particularly efficient method of purifying liquid hydrocarbons, and continuous recovery of the purifying media. It is a further object to provide a method whereby the volatile acidic impurities extracted from the hydrocarbon may be recovered, if desired.

The advantages of this process are numerous. It is of a continuous type, and hence is amenable to close control and gives constant results. The removed impurities, especially those containing sulfur, present no problem of disposal, since they may be recovered as such and can be readily destroyed by burning. The amine absorbents used in the process are more reactive with organic sulfur compounds present in the hydrocarbon liquids than are caustic solutions, and hence a less drastic subsequent "doctor" treatment is required. Tests have also shown that the treatment according to this invention, as compared with the usual caustic treatment, has a less harmful effect on the anti-knock value of gasoline, and that it may tend to stabilize the gasoline against gum formation and oxidation.

In practicing the invention, impure liquid hydrocarbons are brought into contact with the amine absorbent at substantially atmospheric temperature. If the hydrocarbons are normally liquid at atmospheric temperature and pressure, as for instance gasoline and benzene, the process may be carried out at substantially atmospheric pressure. If the hydrocarbon is more volatile, correspondingly higher pressures may be employed.

The amine absorbent of this process comprises a water-soluble, basic-reacting amine, which may be an aliphatic amine or a substituted aliphatic amine or a mixture of such amines. The amine, or mixture, should have a boiling point above that of water and, preferably, a high distribution ratio for water over hydrocarbons, that is, they should be decidedly more soluble in water than in hydrocarbons. The term "aliphatic" denotes those amines in which the only atoms or groups directly attached to the nitrogen are hydrogen, alkyl, or substituted alkyl groups. In these compounds, at least one of said groups must be a substituted alkyl group containing at least one hydroxyl or amino group.

Among those amines which are satisfactory are the various members of the ethanolamines, isopropanolamines, polyethylene and polypropylene amines, the aminopropanediols, and diamino propanols. The preferred compounds of these are monoethanolamine, diaminoisopropanol, and particularly diethylene triamine and triethylene tetramine, or commercial mixtures of the same.

Amines of this class may be defined as those having the general formula $DNR_2$ where D is a substituted alkyl group containing at least one hydroxyl or amino group and where R may be hydrogen, an aliphatic hydrocarbon group, or a substituted aliphatic hydrocarbon group.

The liquid hydrocarbon may be brought into direct contact with the anhydrous amine, or with an aqueous solution of the amine, with or without the presence in the amine of small amounts of the hydrocarbon being treated, or of products formed by impurities therefrom with the amine.

In one method of operation, as shown in the accompanying drawing, the liquid hydrocarbon, such as gasoline, benzene or the like, enters the system through line 10 and is admixed with an aqueous amine solution supplied through line 11. The two liquids are thoroughly mixed in a centrifugal pump 12, and passed through a series of orifice plates 13 for further mixing. The mixture then is passed into a large settling tank or gravity separator 14. From the top of separator 14, the hydrocarbon liquid containing some dissolved amine is drawn through pipe 15 into a second mixing system comprising pump 16 and orifices 17, where it is thoroughly mixed with pure water from pipe 18. The resulting mixture is passed into a second settling tank or gravity separator 19, and the purified hydrocarbon liquid is withdrawn from the top through line 20.

The aqueous amine layer from separator 14 containing the impurities absorbed from the hydrocarbon is drawn off by gravity, as shown in the diagram, through pipe 21 into reservoir 22. Likewise, the water layer from separator 19 containing extracted amine from the hydrocarbon is drawn off through line 23 to reservoir 22, where it is mixed with the amine layer from separator 14. When the water and amine layers are removed by gravity from the bottoms of the separators 14 and 19, as in the particular method shown in the drawing, it is necessary to provide vents 24 and 25 in lines 21 and 23, respectively, to prevent siphoning the complete contents of the separators 14 and 19 into the reservoir 22.

The contents of reservoir 22, comprising a dilute aqueous amine solution containing the extracted impurities from the hydrocarbon, are passed through pipe 26 to a heat exchanger 27 where they are heated by the hot, concentrated and regenerated aqueous amine solution coming from the still kettle 28 through pipe 29. The dilute amine solution, at its increased temperature, passes through pipe 30 to a partial condenser 31 to effect partial condensation of the still vapors entering from line 34, and to absorb more heat before entering still column 32 through pipe 33.

In the still column 32 volatile impurities in the amine solution are expelled and pass upward together with water vapor. These vapors pass through line 34 into the partial condenser 31 where the water is condensed, and the volatile impurities, such as hydrogen sulfide, pass out of the system through line 35. Most of the condensed water passes downward through line 36, and the balance is returned through line 37 to the still column 32 as reflux. The rest of the water is cooled in cooler 38, and returned to pump 16 by way of line 18, and may be reused in the second washing stage of the process.

The amine solution in still column 32 passes downward during the distillation to still kettle 28. From there, it is drawn off by suitable means, such as a pump (not shown), through line 29 to the heat exchanger 27, where it is cooled. The regenerated amine solution is then returned through the pipe 11 to the initial washing stage, thus completing the cycle.

It is to be understood that the foregoing method of operation is by way of illustration only, and that many modifications may be made in the process without departing from the invention. For example, other means of mixing the hydrocarbon liquid and the wash liquors may be used instead of centrifugal pumps 12 and 16 or orifice plates 13 and 17. Also, it is not necessary to mix the water layer in separator 19 with the amine layer in separator 14, since each could be fed separately to the still column 32 to be admitted at different plates. Furthermore, the water washing stage may be omitted if extremely oil-insoluble amines, such as the polyethylene and polypropylene amines, are used, and in many cases it is desirable to extract the impurities from the hydrocarbons with the amine in more than one stage, as will be apparent from the following description. From the standpoint of economy, it is desirable, although not essential, to preheat the dilute amine solution fed to the still column 32 with the waste heat in the amine solution leaving the still kettle 28, or such preheating may be effected in some degree, if not entirely, by exchanger 27, or condenser 31 alone.

Certain strongly acidic impurities, such as hydrogen cyanide, sulfuric acid and similar compounds, will not be wholly eliminated from the amine solution in the distillation or regeneration system, but will remain chemically combined in the amine solution. However, if such substances are present in the liquid hydrocarbons, they are usually present in such extremely small quantities that their effect on this process is negligible.

To illustrate the effectiveness of the process of the invention, a sample of cracked gasoline was agitated with one-fourth its weight of a 5% aqueous triethanolamine solution at atmospheric temperature and pressure. Before treatment, the gasoline contained 0.069% hydrogen sulfide, while after the treatment this was reduced to 0.006%. The gasoline, after thorough agitation with the above amine solution, was found to have dissolved 0.0035 gram of the amine per 100 cubic centimeters of gasoline. When the gasoline saturated to this extent with the amine was shaken with pure water, its amine content was reduced to 0.0004 gram per 100 cc., showing that negligible losses of amine occur in the process.

A three percent aqueous solution of triethanolamine containing 0.2% hydrogen sulfide was taken to correspond to the saturated amine solution after dilution with two-thirds of its volume of wash water. This solution was evaporated to a concentration of 5% triethanolamine, and analysis showed the hydrogen sulfide content to be reduced to below 0.03%. Regeneration for practical purposes was therefore complete.

The process of the invention may be additionally illustrated by the following examples:

Example I

The gasoline employed in this example was a West Texas untreated straight run gasoline of the following approximate sulfur analysis:

| | Grams per 100 cc. |
|---|---|
| Total sulfur | 0.23 |
| Hydrogen sulfide | 0.08 |
| Mercaptans | 0.03 |

The absorbent employed was a mixture of polyethylene amines of the following approximate analysis:

| | Per cent |
|---|---|
| Ethylene diamine | 3 |
| Diethylene triamine | 60 |
| Triethylene tetramine | 30 |
| Tetraethylene pentamine | 5 |
| Water | 2 |

A sample of the gasoline was thoroughly agitated for about five minutes with one-tenth of its volume of a 10 percent solution of the above absorbent in water. The resulting mixture was allowed to separate, yielding a gasoline layer A, and aqueous absorbent layer B. The gasoline layer A was then agitated with one-tenth of its volume of a fresh portion of the aqueous amine absorbent. Separation of this mixture yielded gasoline layer C, and aqueous amine layer D.

A second sample of gasoline was then thoroughly agitated with the absorbent layer D, and, upon separation, yielded the partly purified gasoline layer E and aqueous amine layer F. The partly purified gasoline layer E was then treated similarly with one-tenth of its volume of fresh absorbent, and, upon separation, yielded gasoline layer G and amine layer H. Thereupon, each of the two gasoline samples were separately washed with one-twentieth volume of pure water.

The amine absorbent solutions were analyzed after each treatment, and the hydrogen sulfide content was found to be as follows:

|  | Gram per 100 cc. of solution |
|---|---|
| Aqueous amine layer B | 0.76 |
| Aqueous amine layer D | 0.04 |
| Aqueous amine layer F | 0.78 |
| Aqueous amine layer H | 0.06 |

The samples of gasoline, after completion of the above treatment, were analyzed for their respective contents of hydrogen sulfide and mercaptans, with the following results:

| Gasoline | Hydrogen sulfide | Mercaptans |
|---|---|---|
| Layer C | None | 0.03 gram per 100 cc. |
| Layer G | do | Do. |

Example II

A sample consisting of equal parts of aqueous amine layers B and F from Example I (having a hydrogen sulfide content of 0.77 gram per 100 cc. of solution) was mixed with half its volume of water and boiled rapidly until it reached its initial volume. Analysis showed the boiled solution to contain 0.28 gram of hydrogen sulfide per 100 cc. of solution, and it represents a typical regenerated amine solution which may be employed in the process. This solution, designated as R, was used in another series of treatments of gasoline as described in Example I. The analyses of the corresponding layers of aqueous amine absorbent are as follows:

|  | Gram per 100 cc. of solution |
|---|---|
| Aqueous amine layer RB | 0.92 |
| Aqueous amine layer RD | 0.29 |
| Aqueous amine layer RF | 0.98 |
| Aqueous amine layer RH | 0.33 |

The corresponding samples of purified gasoline, designated as 2C and 2G, gave the following results upon analysis:

| Gasoline | Hydrogen sulfide | Mercaptans |
|---|---|---|
| Layer 2C | None | 0.03 gram per 100 cc. |
| Layer 2G | do | Do. |

From the foregoing examples, it may be seen that the solution of the given extent of regeneration has sufficient absorptive power to remove all traces of any hydrogen sulfide remaining behind after the first stage of extraction, and that two-stage extraction brought about eminently satisfactory sulfur removal.

Analysis was made of the amine content of the gasoline after saturation with a 10 percent aqueous solution of the amine mixture described above and containing hydrogen sulfide as derived in extraction. There was 0.00126 gram of total amines found present in 100 cc. of the gasoline, which corresponds to a loss of 0.0044 pound of amine per barrel of gasoline being treated. Therefore, under conditions where adequate settling time is available, it is economically feasible to eliminate the water-washing operation. However, washing has often proved advantageous for allowing recovery of amine mechanically suspended in hydrocarbons, as well as in reducing still further the small amounts that may be dissolved.

By employing a three stage process, the ratio of amine solution to gasoline can be further reduced, and correspondingly less heat will be required for regeneration in the process with more prolonged contact or stronger amine solutions, substantial quantities of mercaptans are removed. Other variations may also be employed. The process may be used for the liquid phase treatment of normally gaseous bodies, as for instance propane, and when so employed can be carried out in smaller equipment, and in some ways more efficiently than as a gas absorption process.

Many other variations of the process are possible and are included within the invention, as defined by the appended claims.

We claim:

1. The process of removing acidic impurities from hydrocarbon liquids which includes bringing said liquids into contact at substantially atmospheric temperature with a liquid absorbent comprising at least one polyalkylene polyamine, removing absorbed impurities from said absorbent and bringing it into contact with additional hydrocarbon liquid.

2. The process of removing acidic impurities from hydrocarbon liquids which includes bringing said liquids into contact at substantially atmospheric temperature with a liquid absorbent comprising at least one polyethylene amine removing absorbed impurities from said absorbent and bringing it into contact with additional hydrocarbon liquid.

3. The process for removing hydrogen sulfide from hydrocarbon liquids which includes bringing said liquids into contact at substantially atmospheric temperature with an aqueous solution of at least one polyalkylene polyamine, and washing said hydrocarbon liquids with water to remove dissolved amine.

4. The process for removing hydrogen sulfide from hydrocarbon liquids which includes bringing said liquids into contact at substantially atmospheric temperature with an aqueous solution of at least one polyethylene amine, washing said hydrocarbon liquids with water to remove dissolved amine, removing absorbed impurities from said absorbent and bringing it into contact with additional hydrocarbon liquid.

5. The process for removing acidic impurities from hydrocarbon liquids which includes bringing said liquids into contact at substantially atmospheric temperature with an aqueous solution containing diethylene triamine, removing absorbed impurities from said absorbent and bringing it into contact with additional hydrocarbon liquid.

6. The process for removing acidic impurities from hydrocarbon liquids which includes bringing said liquids into contact at substantially atmospheric temperature with an aqueous solution containing triethylene tetramine, removing absorbed impurities from said absorbent and bringing it into contact with additional hydrocarbon liquid.

7. The process for removing acidic impurities from hydrocarbon liquids which includes bringing said liquids into contact at substantially atmospheric temperature with an aqueous solution containing diethylene triamine and triethylene tetramine, removing absorbed impurities from said absorbent and bringing it into contact with additional hydrocarbon liquid.

8. In a process for removing acidic impurities from hydrocarbon liquids, the step which comprises bringing said liquids into contact at substantially atmospheric temperature with a liquid absorbent comprising at least one polyalkylene polyamine.

ALEXANDER L. WILSON.
HARVEY R. FIFE.